April 3, 1928.

E. COENEN 1,664,968

LATHE

Filed Jan. 14. 1926

E. COENEN 1,664,968

LATHE

Filed Jan. 14, 1926

Inventor
E. Coenen
by Langner, Parry, Card & Langner
Attys.

Patented Apr. 3, 1928.

1,664,968

UNITED STATES PATENT OFFICE.

EDOUARD COENEN, OF BRUSSELS, BELGIUM.

LATHE.

Application filed January 14, 1925, Serial No. 31,323, and in Belgium January 22, 1925.

The present invention relates to a lathe whose headstock comprises a fixed shaft adapted to carry a fixed point and a movable shaft concentric with said fixed shaft.

In known lathes of this type the movable shaft is carried by an overhanging part of the fixed shaft. This arrangement does not provide stability as good as in ordinary lathes wherein the movable shaft is supported in at least two bearings.

In the present invention the movable shaft or sleeve concentric with the fixed shaft is supported in two bearings as in ordinary lathes. This arrangement renders the movable shaft entirely independent of the fixed shaft.

According to an embodiment of the invention both of said bearings are placed at the interior of two of three supports holding the fixed shaft in the fixed headstock. This fixed shaft is perforated clear through with a bore permitting the insertion either of the object to be machined or a sleeve which guides a tool such as a drill when the lathe is used as a drilling machine.

This invention also provides for taking up any possible play between the fixed and the rotatable shaft by means of a bearing which is cylindrical on the surface in contact with the movable shaft and conical on that surface in contact with the fixed shaft, said bearing being split or slotted on one of its generatricities so as to be able to slide on the fixed shaft parallel with its axis when a collar is screwed on said shaft.

In accordance with the invention the movable shaft is driven by means of a gear wheel arranged between two bearings on said shaft. Accordingly as the object to be machined requires greater or smaller forces this gear wheel operates through an intermediate shaft located below and laterally of the tool with respect to the lathe shaft, or at the other side of this shaft.

Each of these intermediate shafts is driven by a change speed mechanism.

Operation is effected through a pinion which may be engaged or disengaged with said gear wheel by moving it transversely relative to said axis.

The drawings accompanying the presents specification show an exemplary embodiment of the invention.

Figure 1:
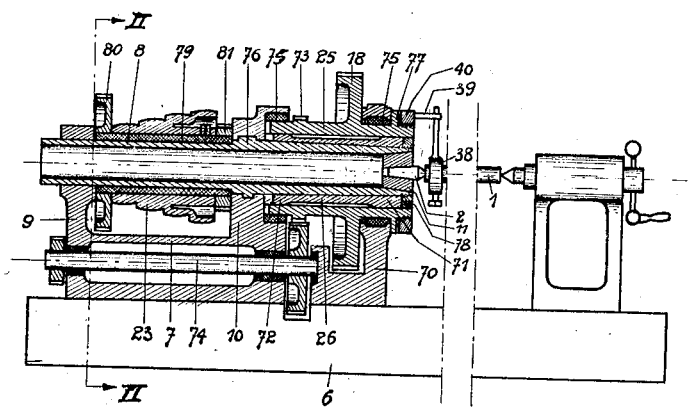
Fig. 1 is an elevation along an axial section through a lathe constructed in accordance with the invention.
Figure 2:
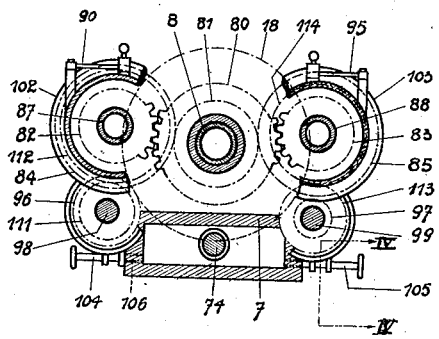
Fig. 2 is a sectional elevation of the lathe along line II—II of Fig. 1.
Figure 3:
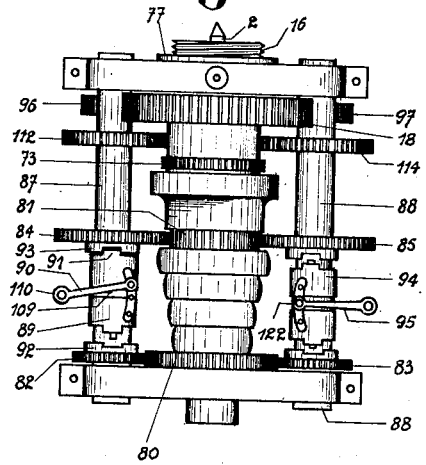
Fig. 3 is a plan view of the lathe along the preceding figures, the lateral flanges covering the transmission gears being removed.

Figs. 1–4 show that the fixed headstock 7 supported on the base 6 has three supports 9, 10 and 70, in which the fixed shaft 8 rests. Engaged between the two supports 10 and 70 on shaft 8 is a movable shaft 25 on which are mounted, on the one hand, a gear wheel 18 set in rotation by an intermediate shaft, and on the other hand, a gear wheel 73 driving an auxiliary shaft 74 which, among other things, serves for advancing the carriage.

This shaft 25 rests in supports 10 and 70 through two bronze bearing 75 and 75'. The front support 70 is thus actually a bearing. The central support 10 is a bearing support or block, since the front one contains the bearing 75' and the rear is a direct support for the fixed shaft 8. The rear block 9 is a true support since it serves only as a direct bearing for the fixed shaft 8.

Fixed shaft 8 is thus supported at three different points.

The part of this fixed shaft 8 comprised between its front end and the bearing support 10 is turned conically externally and terminates in a threaded part in which a collar 78 may be screwed. This conical portion of shaft 8 has a bearing 26 having an internal conical surface corresponding to the surface at the end of the fixed shaft, while its external surface is cylindrical. This bearing 26 is slotted or split along one of its generatricities so that it may open when being pushed by the threaded collar 78 and thus take up any play existing between shaft 8 and movable shaft 25. It is thus possible to maintain the contact between the two shafts constant. Rotation of bearing 26 on fixed shaft 8 is prevented by two plugs screwed on the shaft, the heads of which are seated in a depression or the like of bearing 27, so as to permit the latter to slide on shaft 8.

Rotation of shaft 25 on bearing 26 is effected through two collars 71 and 72 which bearing 26 carries.

By this arrangement all supports or bearings for the chief elements, fixed shaft 8 and movable shaft 28 are assured of stability and there can be no deviation of the axis of the movable shaft with respect to the axis of the lathe.

As a matter of fact, the fixed shaft is supported at three points and the movable shaft 25 is retained at both its ends exteriorly by bearings 75 and 75′ and internally by two collars 71 and 72 of bearing 26. Moreover, the arrangement of the drive wheel 18 between the two bearings of movable shaft 25 eliminates all action on an overhanging part.

The fixed shaft 8 is perforated clear through with a bore of large diameter, the front end of this bore being drilled out conically for a length sufficiently great to receive a sleeve 11 carrying the fixed center 2 or a sleeve having a cylindrical perforation serving to support and guide the drill bits when the lathe is used as a drilling machine.

This shaft 8 not being subjected to torsion, its wall thickness may be considerably reduced and it is thus possible, as compared with ordinarily used lathes, to double the drilling diameter of the shaft for the passage of the bits.

The fixed shaft is prevented from moving axially by means of a rib 76 engaged in a corresponding groove of support 10. Axial pressure is completely absorbed by this rib and the movable elements are not subjected to friction resulting from this pressure as is the case with ordinary lathes.

The movable shaft 25, by means of a flange 77, is supported on bearing 70 and on the other hand is retained by bearing 26, on which the annular stop member 78, screwed on the end of shaft 8, may act.

Shaft 25, at the side of center 2, is provided with a threaded portion on which may be screwed all the plates or other tools to be fitted to the end of the ordinary lathe shaft.

In Fig. 1, the shaft 25 is shown as carrying a plate 40 whose thrust tappet 39 bears freely on a lathe dog 38 attached to the piece to be machined.

This piece 1 is supported by the fixed center 2 of the fixed headstock 7 and the fixed center 3 of the movable headstock 5.

The lathe described permits not only of turning between fixed centers, but also turning "in the air", that is to say, turning on tables and other machines without the help of centers and also turning between a fixed and a movable center. This latter case, which is that of the ordinary lathe, is realized simply by fitting to sleeve 25 a plate carrying a center which turns therewith.

The lathe of the invention is thus at the same time a parallel and a revolving lathe.

The drive mechanism of gear 18 comprises a stepped pulley 23 keyed on a hollow shaft 79 engaged freely on the fixed shaft 8. This shaft 79 likewise carried the two gear wheels 80 and 81.

On each side of the fixed shaft 8 is arranged a shaft 87 or 88 on which gears 82—83 and 84—85, meshing respectively with gears 80 and 81, are idly mounted.

The shaft 87, on which the gears 82—84 are mounted, also serves as a support for a clutch sleeve 89 which may be moved longitudinally of this axis by a handle or the like 90.

The sleeve 89 drives the axis 87 during the course of its rotation, the speed thereof varying accordingly as its jaws 91 are engaged between corresponding jaws 92 of gear wheel 82 or jaws 93 of gear wheel 84. The same is true of clutch sleeve 94 mounted on the shaft 88 and controlled or driven by a handle 95, said sleeve being adapted to contact with wheels 83 or 84.

As the transmission ratio is different for each pair of wheels 80—82, 80—83, 81—84, 81—85, it is evident that with the four-step pulley 23 like that shown, it is possible, without complication or without necessitating great bulk, to effect the drive of wheel 18, and consequently of the drive mechanism, at sixteen different speeds. Drive wheel 18 is driven through pinions 96—97 keyed respectively on intermediate shafts 98—99. A second pinion 111 keyed on the intermediate shafts 98 meshes with a gear wheel 112 keyed on shaft 87, and a pinion 113 attached on intermediate shaft 99 is in mesh with wheel 114 keyed on shaft 88. The intermediate shafts 98—99 are mounted preferably in lateral flanges or plates 102—103 which cover the transmission gears.

Each of these flanges or plates is adapted to pivot about the shafts 87 or 88 under the control of a release mechanism 104—105 which is supported on the one hand by the frame of the headstock and on the other by the flange or plate. In this manner it is possible, for example, to bring the pinion 96 nearer to or further away from the main wheel 18, whereby shafts 87 may be held stationary during the time in which the pinion 97, rotating under the action of one or the other gear 83 or 85, meshes with the main gear 18 and actuates the plate support.

Figure 4:
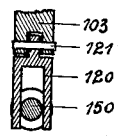
Fig. 4 is a detailed view of the lathe on enlarged scale showing the section along IV—IV of Fig. 2.

The release mechanism 104—105 above mentioned is formed, for example, of a rod with a threaded end which is screwed in a notch or depression 106 of the base and is supported on the side plate or flange through two collars so as to permit of carrying the flange closer to or further away from the base and hence the clutch or release of pinion 96 or 97. As shown in Fig. 4, the element integral with the flange is formed preferably of a fork 120 adapted to pivot about an axis 121 so as to permit the flange or plate to pivot.

By arranging the intermediate shafts 98 and 99 at each side of the fixed shaft a better result is obtained during the operation of the tool than where ordinarily used transmission mechanisms with lathes have a rotating main shaft and a plurality of speeds and in which the intermediate transmission shafts are all grouped at the side of the lathe shaft opposite the tool. The result is that the object being machined rotates through this drive for high as well as low speeds and hence for slight as well as for great forces, with pinions rotating in the same direction and which act on the wheel 18 so as to exert a thrust on the tool, which is particularly disadvantageous where great forces are transmitted.

On the contrary in the arrangement of the present invention the intermediate shafts 98 and 99 are arranged at each side of the fixed shaft 8 of the lathe and thus act at two different points on the drive wheel 18 and hence on plate 40. The points of engagement may thus be chosen so that great forces transmitted at low speed may be transmitted through intermediate shaft 99 so that pinion 97 acts through traction on wheel 18, the direction of rotation of this wheel being clockwise for a person observing Fig. 2 while the pinion 96 driven by intermediate shaft 98 exerts thrust on wheel 18 for transmitting slight forces only. This arrangement which assures uniform operation of the tool and prevents vibration is impossible in ordinary lathes wherein the gears controlling rotation of the spindle are all arranged at the same side thereof, without necessitating complicated devices having a large number of gears.

Other devices for constructing and driving the clutch mechanisms such as 89 and 104—105 may easily be conceived. Instead of roller 109 provided on a rod adapted to be moved angularly by handle 90, sliding in a circular groove 122 of sleeve 89 a thread may be provided on this sleeve which engages with a suitable thread provided on the axis 110 of handle 90.

On the other hand, the invention is not limited to a transmission with a four stepped pulley separately driving four gears of different transmission ratio.

Figure 5:
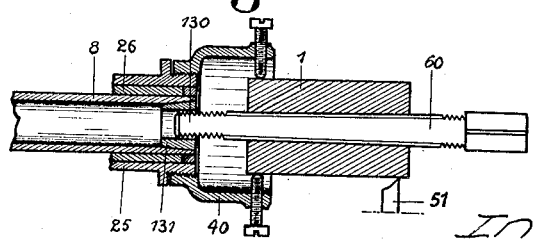
Fig. 5 is an axial section showing the use of the lathe as a drilling machine.

Fig. 5 shows an applicaion of the lathe as a drilling machine, in accordance with which the free end 130 of a drill or bit mandrel 60 is guided in a sleeve 131 of approximately equal internal diameter. The object to be machined, as above, is actuated by a plate 40 affixed to the end of the movable shaft 25. This figure likewise shows the possibility of exterior turning by means of tool 51.

What I claim as my invention and desire to secure by Letters Patent is:

1. A lathe comprising a fixed shaft carrying a fixed center, a tubular shaft rotating about the fixed shaft, an intermediate shaft driving the tubular shaft, two bearings encompassing the tubular shaft, two bearing blocks containing said bearings, and three supports encompassing the fixed shaft.

2. A lathe comprising a fixed shaft carrying a fixed center, a tubular shaft rotating about the fixed shaft, an intermediate shaft driving the tubular shaft, three supports encompassing the fixed shaft, two bearings encompassing the tubular shaft, two bearing blocks containing said bearings, constituted by two of the three supports of the fixed shaft.

3. A lathe comprising a fixed shaft carrying a fixed center, a tubular shaft rotating about the fixed shaft, an intermediate shaft driving the tubular shaft, two bearings encompassing the tubular shaft, two bearing blocks containing said bearings, three supports encompassing the fixed shaft, a bearing placed between an exterial conical part of the end of the fixed shaft and an internal cylindrical part of the tubular shaft, a longitudinal cleft in this latter bearing, and means to slide the bearing in the direction of the axes of said shafts.

4. A lathe comprising a fixed shaft carrying a fixed center, a tubular shaft rotating about the fixed shaft, an intermediate shaft driving the tubular shaft, two bearings encompassing the tubular shaft, two bearing blocks containing said bearings, three supports encompassing the fixed shaft, a bearing placed between an external conical portion of the end of the fixed shaft and an internal cylindrical portion of the tubular shaft, a longitudinal cleft in said latter bearing, a threaded portion at the end of the fixed shaft, and a nut applied against the split bearing engaging on said threaded part.

5. A lathe comprising a fixed shaft carrying a fixed center, a tubular shaft rotating about the fixed shaft, an intermediate shaft driving the tubular shaft, two bearings encompassing the tubular shaft, two bearing blocks containing said bearings, three supports encompassing the fixed shaft, and a gear wheel arranged on the tubular shaft between the two bearings thereof and serving to rotate it.

6. A lathe comprising a fixed shaft carrying a fixed center, a tubular shaft rotating about the fixed shaft, two bearings encompassing the tubular shaft, two bearing blocks containing said bearings, and an intermediate shaft driving the tubular shaft arranged at each side of the fixed shaft, when the number of speeds to be transmitted to the tubular shaft is great.

7. A lathe comprising a fixed shaft carrying a fixed center, a tubular shaft rotating about the fixed shaft, two bearings encompassing the movable shaft, two bearing blocks containing said bearings, an intermediate shaft driving the tubular shaft arranged at each side of the fixed shaft, the intermediate shaft for transmitting great forces being located at the side of the tool with respect to the fixed shaft and below the tool, and the intermediate shaft transmitting slight forces being located at the other side of the fixed shaft.

8. A lathe comprising a fixed shaft carrying a fixed center, a tubular shaft rotating about the fixed shaft, two bearings encompassing the tubular shaft, two bearing blocks containing said bearings, an intermediate shaft driving the tubular shaft arranged at each side of the fixed shaft, and a change speed mechanism driving each intermediate shaft.

9. A lathe comprising a fixed shaft carrying a fixed center, a tubular shaft rotating about the fixed shaft, two bearings encompassing the tubular shaft, two bearing blocks containing said bearings, an intermediate shaft driving the tubular shaft arranged at each side of the fixed shaft, a drive pulley mounted idly on the fixed shaft, a gear located at each extremity of the drive pulley and fixed thereupon, two gears mounted idly on shafts located on each side of the fixed shaft and engaging with the preceding ones, a clutch member fixed angularly on each of these two shafts but slidable along them, means for putting each clutch member separately in contact with the idly mounted gears, a gear keyed on each of these shafts, a gear keyed on each of the intermediate shafts engaging with the preceding gear, and means for varying the distance between the tubular shaft and each intermediate shaft so that a pinion keyed on each intermediate shaft may be put into or out of engagement with the gear wheel keyed on the tubular shaft.

10. A lathe comprising a fixed shaft carrying a fixed center, a tubular shaft rotating about the fixed shaft, two bearings encompassing the tubular shaft, two bearing blocks containing said bearings, an intermediate shaft driving the tubular shaft arranged at each side of the fixed shaft, a drive pulley mounted idly on the fixed shaft, a gear located at each extremity of the drive pulley and fixed thereupon, two gears mounted idly on shafts located on each side of the fixed shaft and engaging with the preceding ones, a clutch member fixed angularly on each of these two shafts but slidable along them, means for putting each clutch member separately in contact with the idly mounted gears, a gear keyed on each of these shafts, a gear keyed on each of the intermediate shafts engaging with the preceding gear, and means for varying the distance between the tubular shaft and each intermediate shaft so that a pinion keyed on each intermediate shaft may be put into or out of engagement with the gear wheel keyed on the tubular shaft, by moving these pinions transversely with respect to their axis.

11. A lathe comprising a fixed shaft carrying a fixed center, a tubular shaft rotating about the fixed shaft, two bearings encompassing the tubular shaft, two bearing blocks containing said bearings, an intermediate shaft driving the tubular shaft arranged at each side of the fixed shaft, a drive pulley mounted idly on the fixed shaft, a gear located at each extremity of the drive pulley and fixed thereupon, two gears mounted idly on shafts located on each side of the fixed shaft and engaging with the preceding ones, a clutch member fixed angularly on each of these two shafts but slidable along them, means for putting each clutch member separately in contact with the idly mounted gears, a gear keyed on each of these shafts, a gear keyed on each of the intermediate shafts engaging with the preceding gear, and means for varying the distance between the tubular shaft and each intermediate shaft so that a pinion keyed on each intermediate shaft may be put into or out of engagement with the gear wheel keyed on the tubular shaft, by moving these pinions transversely with respect to their axis, said means consisting in rotating a threaded rod which is screwed in a fixed part of the base and which carries collars between which are placed projections carried by movable elements supporting each an intermediate shaft and which pivot about the shaft located between the fixed shaft and each intermediate shaft.

In testimony whereof I have signed my name to this specification.

EDOUARD COENEN.